United States Patent
Aue

(10) Patent No.: US 8,824,531 B2
(45) Date of Patent: Sep. 2, 2014

(54) METHOD AND A SYSTEM FOR ESTIMATING A SYMBOL TIME ERROR IN A BROADBAND TRANSMISSION SYSTEM

(75) Inventor: Volker Aue, Dresden (DE)

(73) Assignee: NXP, B.V., Eindhoven (NL)

( * ) Notice: Subject to any disclaimer, the term of this patent is extended or adjusted under 35 U.S.C. 154(b) by 1081 days.

(21) Appl. No.: 12/097,649

(22) PCT Filed: Dec. 12, 2006

(86) PCT No.: PCT/IB2006/054777
§ 371 (c)(1),
(2), (4) Date: Jun. 16, 2008

(87) PCT Pub. No.: WO2007/069199
PCT Pub. Date: Jun. 21, 2007

(65) Prior Publication Data
US 2008/0267273 A1    Oct. 30, 2008

(30) Foreign Application Priority Data
Dec. 16, 2005 (EP) .................................... 05112274

(51) Int. Cl.
*H04B 17/00* (2006.01)
*H04L 27/26* (2006.01)

(52) U.S. Cl.
CPC ........ *H04L 27/2662* (2013.01); *H04L 27/2679* (2013.01)
USPC ......................................... 375/224; 375/343

(58) Field of Classification Search
CPC ............ H04L 27/2647; H04L 27/2662; H04L 27/2663; H04L 27/2665
USPC .................................. 375/224, 343
See application file for complete search history.

(56) References Cited

U.S. PATENT DOCUMENTS

| | | | |
|---|---|---|---|
| 6,650,617 B1* | 11/2003 | Belotserkovsky et al. | ... 370/210 |
| 2003/0156534 A1* | 8/2003 | Coulson et al. | 370/210 |
| 2004/0008802 A1* | 1/2004 | Galperin et al. | 375/343 |
| 2004/0161055 A1* | 8/2004 | Sinha | 375/322 |
| 2006/0092902 A1* | 5/2006 | Schmidt | 370/342 |
| 2007/0198625 A1* | 8/2007 | Torosyan | 708/490 |

FOREIGN PATENT DOCUMENTS

| | | | |
|---|---|---|---|
| EP | 1330087 A2 | 7/2003 | |
| EP | 1331783 A2 | 7/2003 | |

OTHER PUBLICATIONS

Lee, Donghoon; et al "A New Symbol Timing Recovery Algorithm for OFDM Systems" IEEE Transactions on Consumer Electronics, vol. 43, No. 3, Aug. 1997, pp. 767-775.

Zou, Hanli; et al "An Integrated OFDM Receiver for High-Speed Mobile Data Communications" IEEE Global Telecommunications Conference, vol. 5 of 6, Nov. 25, 2001, pp. 3090-3094.

Shi, Kai; et al "Decision-Directed Fine Synchronization for Coded OFDM Systems" IEEE International Conference on Acoustics, Speech, and Signal Processing, vol. 4, May 17, 2004, pp. 365-368.

\* cited by examiner

*Primary Examiner* — Shuwang Liu
*Assistant Examiner* — David S Huang

(57) ABSTRACT

The invention relates to a method and a system for estimating a symbol time error in a broadband transmission system, comprising:
  determination a time error signal of an output-signal of a discrete Fourier-transformation block (5) in a data symbol stream on the basis of intersymbol correlation using a predetermined period in each received symbol,
  selecting as a predetermined period last samples of a useful data part of an actual symbol and a preceding symbol after the discrete Fourier-transformation,
  determining the time error value ($\epsilon$) based on the intersymbol interference of the selected samples of the actual symbol and the preceding symbol.

24 Claims, 6 Drawing Sheets

PRIOR ART

METHOD AND A SYSTEM FOR ESTIMATING A SYMBOL TIME ERROR IN A BROADBAND TRANSMISSION SYSTEM

BACKGROUND

The invention relates to a method and a system for symbol time error estimation in a broadband transmission system.

The invention is preferably used in data transmission systems employing orthogonal frequency division multiplexing (OFDM), in particular in wireless applications for digital video broadcasting (DVB, e.g. DVB-H, DVB-T), but can also be used for other transmission modes, such as ISDB-T, DAB, WiBro and WiMax. DVB, e.g. DVB-H and DVB-T are known standards for bringing digital television content for instance to mobile devices.

Such orthogonal frequency division multiplexing systems are very sensitive to the intersymbol interference (ISI), which is caused by the loss of orthogonality of the symbols. The invention relates to the compensation of the intersymbol interference by estimating a symbol time error.

The orthogonal frequency division multiplexing mode is a mode which converts a stream of symbols in a frame into parallel data of a block unit and then multiplexes the parallel symbols into different sub-carrier frequencies. The multi-carrier multiplex has the property that all carriers are orthogonal to one another with respect to a certain length that is typically $2_n$ such that a fast Fourier-transformation can be used. The OFDM mode is implemented with the discrete Fourier-transformation (DFT) at a receiver and the inverse discrete Fourier-transformation (IDFT) at a transmitter, which is simply obtained by the orthogonal property and the definition of the discrete Fourier-transformation.

In broadband transmission systems, a guard interval is formed by a cyclic extension preceding the output of the inverse discrete Fourier-transformation for each OFDM symbol.

FIG. 1 shows the conventional structure of an OFDM symbol that is protected by a guard interval. The guard interval is formed by a cyclic prefix, i.e. a copy of the last samples of the so-called useful part is preceding the useful part. If there is no multipath, the receiver can select a window that is the size of the useful part anywhere within this symbol as shown in FIG. 2.

The guard interval protects the useful data carrying part from multipath distortion, and, if chosen sufficiently long, allows for single frequency networks (SFN). In an SFN, multiple transmitters transmit the same signal synchronously such that at a receiver those signals can be treated as multipath signals.

In multipath propagation environments, a transmitted signal reaches the receiver through multiple paths each of which may introduce a different delay, magnitude and phase thereby enlarging the transition time from one symbol to the next. If the transition time is smaller than the guard interval, the receiver can select a portion of the received symbol that is free from any interference introduced by adjacent symbols.

Identifying the useful part, i.e. the part of an OFDM symbol that contains minimum interference from adjacent symbols (intersymbol interference), is a time synchronization task to be performed by the receiver. This task is critical to the overall receiver performance.

Time synchronization can be grouped into two main categories: acquisition and tracking. Symbol time acquisition defines the task of initially finding the correct timing. Often, the symbol time acquisition is divided into two or more steps, where in the first step, coarse time synchronization is achieved. In the following steps, the time window is refined. For those successive steps, similar or identical algorithms that are used for tracking are often applied. Tracking defines the task of constantly adjusting the time window in the course of continuous reception to keep the time window in its optimum location.

For OFDM, many efforts have been made for time tracking. The known methods can be grouped into data assisted and non-data assisted tracking, and pre-FFT or post-FFT based tracking. Data assisted tracking makes use of known symbols in OFDM, e.g. pilot symbols or preambles, where non-data assisted tracking makes use of the correlation properties of the signal.

In DVB-T which is aimed at continuous reception, the standard does not define any preambles. Pilot symbols are included in the multiplex, where the standard defines so-called scattered pilots at every $12^{th}$ carrier, and a smaller number of continual pilots that are present at fixed carrier locations.

The conventional insertion of the scattered pilots that are boosted in power as described in FIG. 11, on page 27 of European Telecommunication Standards Institute ETSI EN 300 744 V 1.4.1 (2001-01).

Those pilot symbols are only accessible after the DFT and only after some coarse time synchronization has already been established. Therefore, most time synchronization algorithms for DVB-T/H use the auto-correlation properties of the OFDM symbols with its cyclic extension for coarse symbol time estimation, and then rely on the pilots for fine time synchronization and tracking.

In DVB-T the guard interval can be selected to be ¼, ⅛, 1/16, or 1/32 of the FFT (or DFT) size. In large scale single frequency networks (SFNs) even a guard interval of ¼ of the FFT size can almost be fully used by multipath. In some cases, it has been found that the delay spread even exceeds the guard interval. With pilots at every $12^{th}$ carrier, a channel impulse response of a time span of only 1/12 of the FFT length can be estimated which is clearly not sufficient for guard intervals equal or greater than ⅛. For reliable time synchronization for guard intervals equal to ⅛ of the FFT size or longer, it is therefore necessary to collect pilots from successive symbols in the same or similar fashion as it is done for estimating the channel transfer function that is needed for the frequency domain equalizer.

Two basic approaches for post-FFT based time synchronization are known both using an estimate of the channel transfer function: The first one calculates the average phase difference from one scattered pilot to the next thereby estimating the mean slopes of the channel transfer function. This is based on the property of the FFT that a delay in time domain corresponds to a phase proportional to the carrier index and proportional to the delay in time domain. Therefore, in single paths channels, the time delay, which is denoted as τ in FIG. 2, can be directly estimated from the slope. Unfortunately, this technique does not perform satisfactorily under heavy multipath conditions. The more rigorous approach is to transfer the estimated channel transfer function back into time domain by means of an IFFT to obtain an estimate of the channel impulse response. Afterwards an energy search is performed on the estimated channel impulse response.

Another known approach is based on the continual pilots only.

A known alternative to post-FFT based time synchronization is to further improve the time domain correlation based method typically used for coarse time synchronization.

As discussed above, time tracking is crucial for the overall system performance. In DVB-T/H, the lack of preambles that could help accurately estimate the channel impulse response makes it difficult to find the optimum time window.

Some pre-FFT time domain based time tracking techniques that make use of the auto-correlation properties have been found to require relatively long averaging times to yield adequate results. Another disadvantage is that after the signal has been acquired; those types of calculations are not required elsewhere in the receiver. Additionally, the performance under heavy multipath is not always optimum.

The post-FFT based methods introduced above also have disadvantages.

As said above, the simple method using the estimate of the mean value of the slope of the channel transfer function, albeit giving satisfactory results in channels with low delay spread, has been found not to give adequate results under heavy multipath conditions as can be experienced in SFNs. Experiments have shown that this method does not withstand tests for guard interval utilization in single frequency networks.

The most robust technique up to now seems to be the IFFT based method, which calculates the channel impulse response from the estimated channel transfer function. This method, however, also is the most computational intensive method and requires additional memory. The problem that needs to be overcome when using this type of algorithm is the cyclic wrapping of the channel impulse response after ⅓ the FFT length that is due to the scattered pilot spacing at every third carrier when multiple symbols are collected. The cyclic wrapping may make it difficult to identify the beginning and end of the channel impulse response. Identifying the impulse response is also difficult in noisy environments, when the energy of the impulse response is spread over a large time interval.

DVB-H designed for mobile reception imposes additional challenges on the symbol time synchronization algorithms:
(1) In a mobile environment, the coherence time of the channel is lower, i.e. the channel is more time-varying.
(2) DVB-H makes use of time slicing. In time slicing, data are transmitted in bursts allowing the receiver to be switched off between bursts. This feature that allows the receiver to save a great deal of power consumption, however, also means that the channel cannot be tracked between bursts.

As a merit, the time tracking algorithms for DVB-H must be substantially faster than for DVB-T.

To illustrate those challenges, the following example of a two-path model as used in a test case is considered.

FIG. 3 shows the magnitude of the impulse responses of the conventional two path model at two timing instances, t1 and t2, respectively. The two paths are separated by 0.9 times the guard interval duration Tg. At time instant t1, the second path is not really visible, as it is faded. In the real world, the first path may originate from one transmitter, and the second from another transmitter. Both transmitters synchronously transmit the same signal on the same frequency (SFN). At time instant t1, the second path is not visible as it can be blocked by an obstacle (shadow fading) or the path is actually a superposition of multiple paths that at time instance t1 add destructively (fast fading). A receiver locking to a received signal that experienced this channel at time instance t1, only sees the first path, and may just center this path to the middle of the guard interval. If the receiver is synchronizing to the signal to receive time-sliced bursts, it essentially has no history on the channel to rely on.

When after a relatively short time, e.g., a couple 10 ms the second path occurs, the receiver has to quickly readjust the symbol timing and place both paths into the guard interval such that no intersymbol interference occurs in the useful part.

Likewise, it is also possible that at time instance t1, the first path was subject to fading, and the receiver initially locked onto the second path.

This example shows that the symbol time tracking requirements for DVB-H are much more stringent than for continuous reception especially in stationary or quasi-stationary environments.

For DVB-T, it has often been argued that the computational load of the IFFT based method can be reduced, since the symbol time tracking can be done on a lower rate, and thus an IFFT does not have to be computed for every received symbol. In the context of mobile DVB-H, i.e. rapidly time varying channels and fast reacquisition times to reduce on-times and therefore power consumption, this assumption does not hold.

SUMMARY

It is a object of this invention to specify a new method and a system for estimating a symbol time error for avoiding intersymbol interference.

According to the invention, the problem is solved by a method for estimating a symbol time error in a broadband transmission system and by a system for estimating a symbol time error in a broadband transmission system.

The key aspect of the invention is the determination of a time error signal of an output-signal of a discrete Fourier-transformation block in the data symbol stream on the basis of intersymbol correlation using a predetermined period in each received symbol. A number of samples of the output of the DFT or FFT of an actual symbol and a preceding symbol are selected as a predetermined period. A time error value is determined on the base of the intersymbol interference of the selected samples of the actual symbol and the preceding symbol. Instead of the preceding symbol a succeeding symbol can be used.

In more detail, in a receiver of the broadband transmission system a symbol time error estimator is established. The preferred symbol time error estimator comprises a unit for selecting a number of output samples of the discrete Fourier-transformation of each received symbol and a buffer for storing the selected samples of one of the symbol, e.g. of the actual symbol, the preceding symbol or the succeeding symbol. Furthermore, the symbol time error estimator comprises a unit for shifting the selected output sample of the relevant symbol (e.g. the actual symbol or the preceding symbol or the succeeding symbol) by a predetermined number of samples to left or right. These shifted samples of the relevant symbol are element-wise complex-conjugate multiplied with a predetermined phase vector. After the phase Modification of the shifted samples the phase modified output samples are element-wise complex-conjugate multiplied with the selected output samples of the buffered symbol. The element-wise multiplied output signals are accumulated to an averaged sum-signal which represents the time error value. To map the time error value to a real or imaginary axis, the sum-signal is multiplied with a phase rotating constant. Alternatively, the phase rotating constant is included in the phase vector.

Accordingly, the present invention provides a robust scheme to rapidly acquire and continuously track the timing of OFDM symbols. In a preferred embodiment, the determined time error value of the time error estimator is used to adjust, especially to advance or retard the fast Fourier-transformation selection window or to increase or decrease a sample conversion rate in a sample rate converter in a case a sample rate converter is used or to increase or decrease a sample rate in an analog-digital converter in a case an analog-digital converter is used.

In other words: The present invention is a new non-data assisted method for time tracking the symbols. The symbol time error estimator and the method for estimating the symbol time error is based on the frequency domain.

Based on a new non-data assisted criterion the invention is concerned with symbol time synchronization for data modulated OFDM signals that use a cyclic prefix (or suffix) to protect the symbols from intersymbol interference. Since mostly all OFDM systems make use of this scheme, and the criterion is non-data assisted, the invention is applicable to a wide range of ODFM based systems. The invention works for OFDM with arbitrary FFT lengths (large FFT sizes yield less noisy estimates) and most practical guard intervals (at least from 1/32 to 1/2).

The invention makes use of a novel criterion that yields as an absolute value a value proportional to the occurring intersymbol interference and as its sign the direction in which to adjust the timing. This way, the receiver can adjust its timing such that the intersymbol interference of the received symbols is reduced to its minimum. The error estimate itself is unbiased.

The invention delivers an error signal for the symbol timing that can be used in a conventional tracking loop to adjust the time window to select the optimum sample vectors for the demodulator. The performance of the invention combined with the conventional tracking loop is expected to be equivalent, if not exceed the performance of the IFFT based channel impulse response estimation method. The criterion yields good results in single path and multipath environments including SFN, even if the delay between paths exceeds the guard interval duration. It also yields good results when the impulse response is spread out over a long duration inside the guard interval.

The error signal is derived from the output of the FFT and takes into account the FFT output of either the preceding or succeeding symbol. Thus, the invention is solely post-FFT based.

The computational complexity and memory requirements are comparable to the simple slope estimation method. An additional IFFT as most commonly used today is not needed.

The invented time tracking algorithm maps well on standard digital signal processors.

Different implementation variants exist such that the tracking loop can be adapted to the implementation and performance needs of the application.

Furthermore, it is possible to combine those implementation variants to even increase the performance.

If parameters are chosen correctly, the tracking range of the invented tracking loop is half the FFT size samples (equivalent to a duration Tu/2) to the left or right of the guard interval. In the range of a quarter FFT size samples (equivalent to duration of Tu/4), the mean error signal derived by the time error estimator is almost proportional to the actual time error, making the time estimator ideal for conventional tracking loop implementations.

Depending on the equalizer implementation (not subject of this invention), a compensation of the mean slope of the channel transfer function may be needed. Compensation of the slope can be done by multiplication in the frequency domain with a vector that has a linearly increasing or decreasing phase, or by cyclically shifting the input vector of the FFT. With an inclusion of a correction factor, the invention can cope with FFT outputs for which the FFT input has been cyclically shifted. Thus, the invention also fits well into receiver structures that make use of the cyclic FFT input vector shift technique.

DETAILED DESCRIPTION OF THE INVENTION

For a detailed description on how to use the invention, at first, a typical DVB-T/H receiver is considered.

Figure 1:
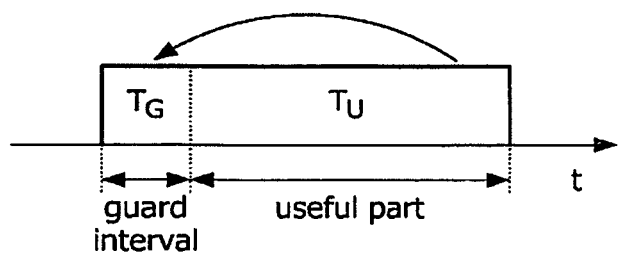
FIG. 1 shows the conventional structure of an OFDM symbol that is protected by a guard interval.
Figure 2:
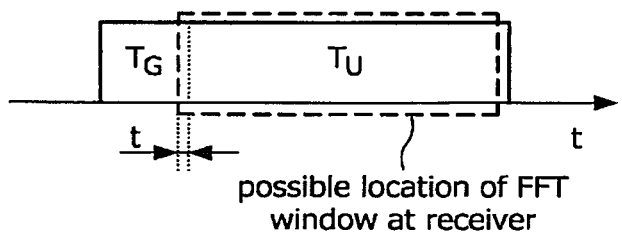
FIG. 2 shows the possible location of the FFT window at the receiver.
Figure 3:
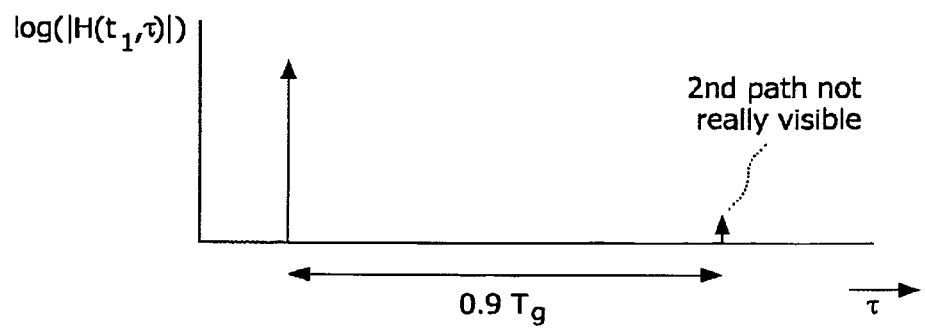
FIG. 3 shows the magnitude of the impulse responses of the conventional two path model at two timing instances, t1 and t2, respectively.
Figure 3:
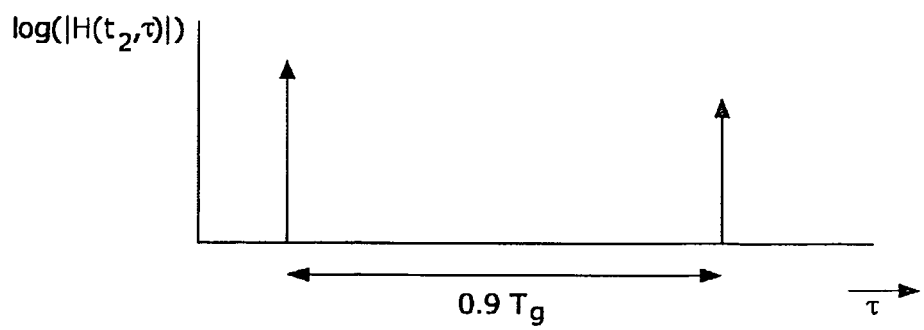
Figure 4:
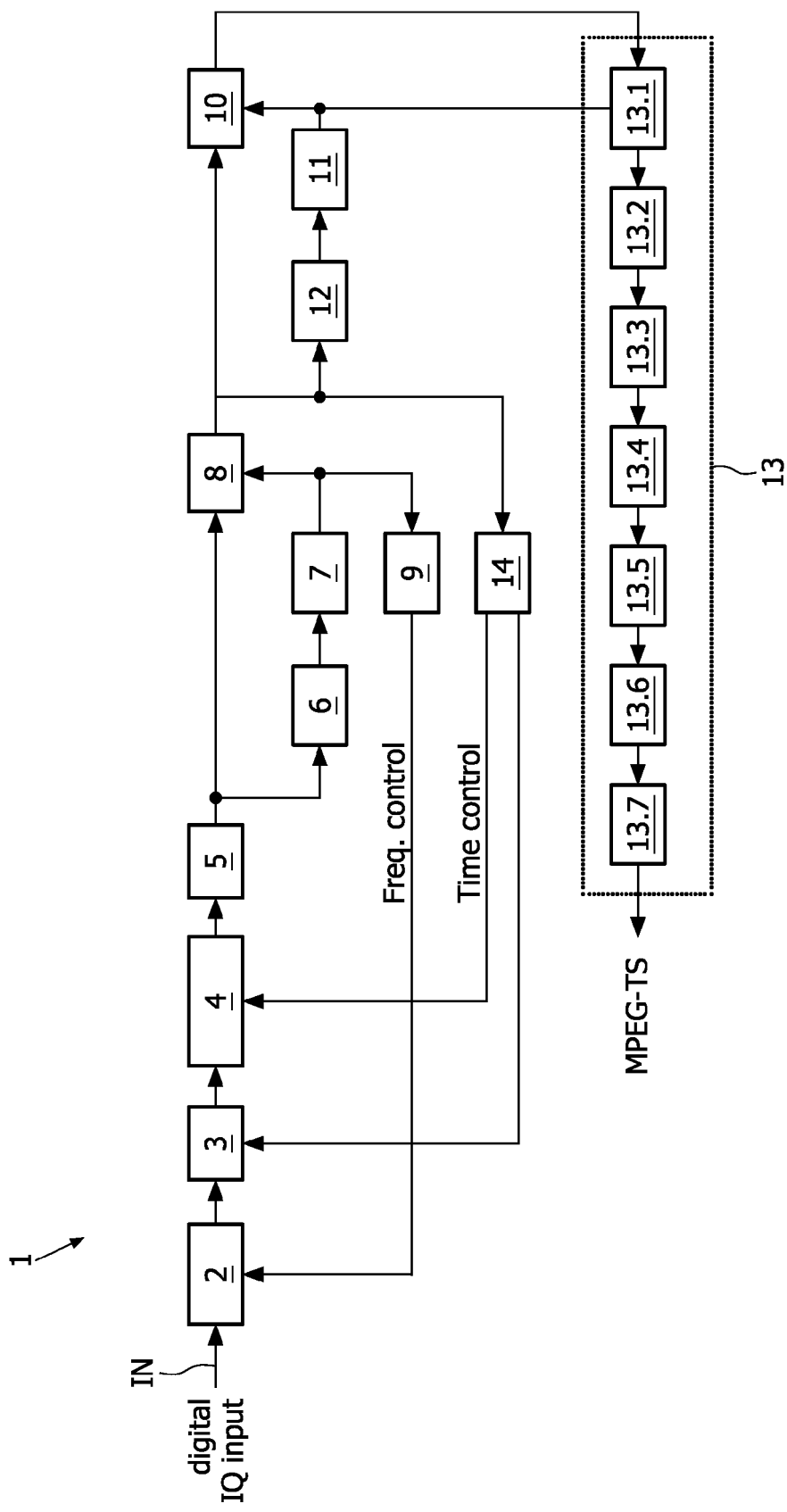
FIG. 4 shows a block diagram of a preferred embodiment of a receiver for a broadband transmission system.

FIG. 4 shows the block diagram of a typical DVB-T/H receiver 1. For simplicity, the circuitry for pre-FTT based acquisition is not shown. The digital IQ input IN that is provided by the analog-front-end, an analog-to-digital-converter (ADC), and additional digital filter circuitry, is further frequency error corrected often by controlling a digital frequency shifter in a frequency error correction unit 2.

The corrected signal is then fed through a sample-rate-converter 3 (SRC) that can correct for sampling frequency offset between the transmitter and the receiver ADC(s). The sample-rate-converter 3 may optionally include additional decimation and low-pass filtering.

After correction of frequency and sample frequency clock offsets, for each symbol, a unit 4 for window selection and removing the guard interval Tg is used. In more detail, a vector of FFT size samples is, selected. On this vector, the FFT is performed in an FFT unit 5.

Depending on the receiver implementation, residual common phase error (CPE) needs to be removed. Typically, the continuous pilots are extracted from the multiplex in a unit 6 and are used for estimating the common phase error in a unit 7 from which an adequate estimate is obtained. This estimate is then used to correct the common phase error at the output of the FFT unit 5 in a CPE correction unit 8.

The estimate common phase error can further be used for tracking any residual frequency offset in a frequency tracking circuit 9 to control the frequency error correction block 2.

For successive processing, the impairments added by the channel must be removed from the CPE corrected symbol by means of an equalizer 10. An estimate of the channel transfer function (CTF) is obtained from a channel estimator 11 by using the scattered pilots extracted from the multiplex in a scattered pilot extraction unit 12. Typically, the channel estimate is obtained by means of interpolation the channel from the scattered pilots based estimates in time- and frequency domain.

The corrected OFDM symbol and the estimated channel transfer function are then transferred to the outer receiver 13. The outer receiver 13 then performs symbol demapping, symbol and bit deinterleaving, depuncturing, convolutional decoding typically by the means of a Viterbi processor, outer (Forney) deinterleaving, Reed-Solomon decoding, and finally derandomizing (descrambling) to deliver an MPEG transport stream (MPEG-TS). Therefore, the outer receiver 13 comprises a plurality of conventional functional blocks or units 13.1 to 13.7.

The proposed time tracking algorithm as described in this invention disclosure uses the output of the FFT unit 5 (this configuration is not shown) or of the CPE correction unit 8, as shown in FIG. 4, which connects with a symbol time error estimator 14 for symbol time control the window selection unit 4 or the sample-rate-converter 3. This is in contrast to other known techniques that use the scattered pilots or an estimate of the channel transfer function CTF.

Figure 5:
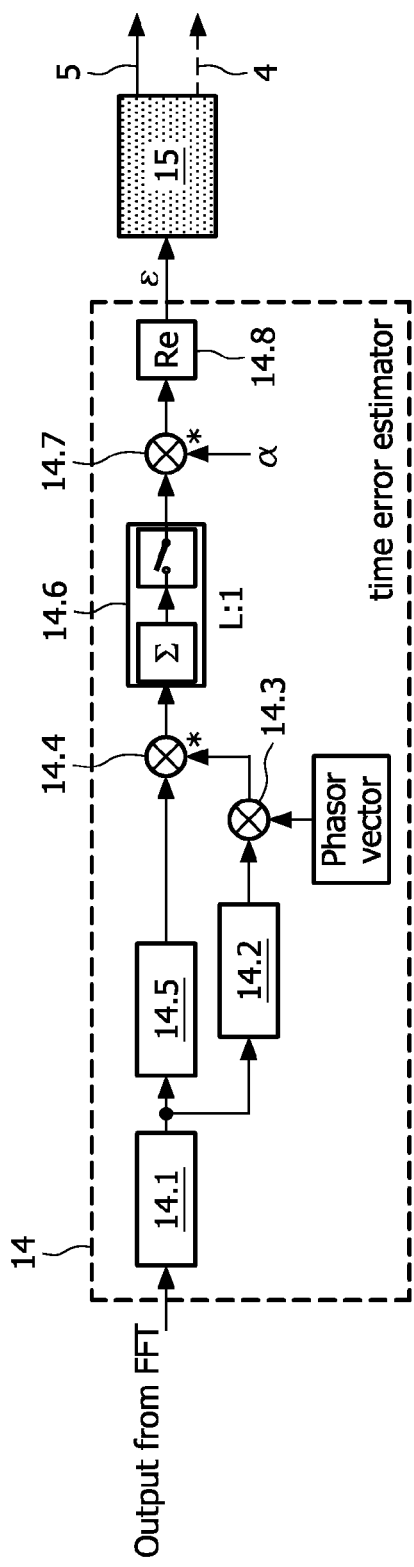
FIGS. 5 to 6 show block diagrams of different preferred embodiments of a symbol time error estimator of a receiver.

FIG. 5 shows the block diagram of a possible implementation of the proposed time tracking algorithm, where the invented symbol time error estimator 14 is emphasized. The symbol time error estimator 14 takes the output samples of the FFT unit 5. For best performance, it is suggested that the CPE corrected output is fed into the symbol time error estimator 14.

For time error estimation, only the output samples of the FFT that contain carriers are useful. For clarity, a block 14.1 that selects those carriers is shown in the block diagram. In order to reduce computational complexity, it is also possible to only select a subset of those carriers. Selecting only a subset of carriers, however, comes at the expense of a noisier error estimate a requiring a smaller loop filter bandwidth for similar time jitter. If this can be tolerated depends on the required tracking convergence time. The set of carriers or subset should be in sequential order.

In the depicted implementation, in a unit 14.2 the selected output samples are shifted by a fixed number of N samples to either the left or right. In a further functional unit 14.3, the shifted output samples are element-wise complex-conjugate multiplied with a complex phasor vector, where the elements of this phase vector are of the kind $\exp(j\phi_n)$. The absolute value of the slope of this phase vector, i.e. the difference between $\phi_n$ and $\phi_{n-1}$ is $2\pi Tg/Tu$, where Tg/Tu is the ratio of the guard interval duration Tg and the length of the useful part Tu. The sign of the slope, i.e. whether the slope is positive or negative depends on where the succeeding sample shift is applied, and if a cyclic prefix or suffix is used.

Then in a functional unit 14.4, the output vector of the multiplication with the phasor vector (=phase modified samples) is element-wise complex-conjugate multiplied with the selected FFT output samples of a preceding symbol. Therefore, the selected samples of the preceding symbol are stored in a buffer unit 14.5.

Figure 6:
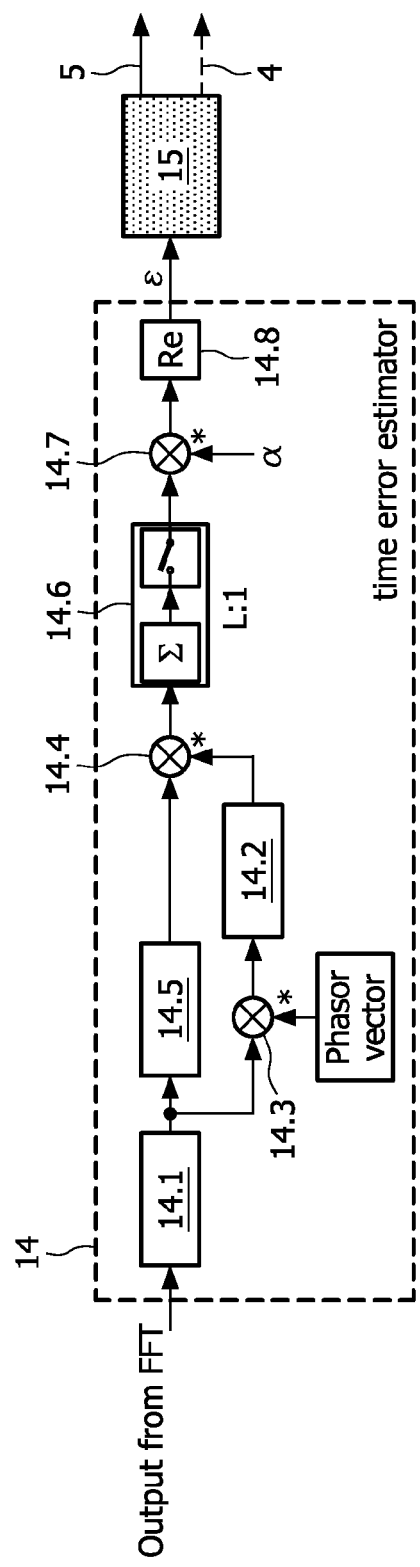

In a different embodiment of the invention, the shifting of the selected FFT output samples is applied after the phasor multiplication, see FIG. 6.

In a different embodiment of the invention, the phasor multiplication is applied to the output of the buffered carriers, e.g. of the preceding symbol or of a succeeding symbol, instead of the carriers of the current symbol. Another embodiment shifts the buffered symbol, if applicable after the phasor multiplication, by either N carrier samples to the left or right. Both alternative embodiments are not shown.

Yet another variant is to distribute the phasor multiplication over both branches, and/or apply a shift to one of the both branches.

Practical values for the samples shifts are −2, −1, 1, and 2, but other values are possible albeit the performance then typically decreases in both tracking range and noise level of the error estimate.

Out of the output of the element-wise multiplication of the FFT samples from the current and the previous or preceding symbol, the averaged sum is calculated in a sum unit 14.6. This operation is often referred to as "integrate and dump".

The output of this operation is multiplied with another phase rotating constant α of the type $\alpha = \exp(j\phi)$ in a unit 14.7. To map the symbol time error value ε to either the real or imaginary axis a mapping unit 14.8 follows. If the symbol time error value ε is mapped to the real axis, the real part from this complex multiplication is given out as the symbol time error value ε as shown in FIG. 6. If the symbol time error value ε is rotated to the imaginary axis, the imaginary part of this multiplication is given out as the symbol time error value ε.

Typically, the phase φ of α is the sum of a phase that is dependent on the guard interval Tg and the amount of sample shifts N applied to either of the two branches, and a phase of an integer multiple of π/2 to rotate the signal to either the real or imaginary axis and adjust the sign to the demands of the succeeding loop filter(s). The absolute value of the first phase is $2\pi |N| Tg/Tu$ and accommodates the length of the guard interval Tg with respect to the useful part of the OFDM symbol as well as sample shift difference between the two branches formed by the samples of the current symbol and the delayed (buffered) symbol.

In another embodiment of the application, α is included in the phasor vector. This way, only the real or imaginary part needs to be computed by the multiplication of the two branches that include the samples of the previous and the current symbol. This way, half of the real multiplications can be saved and the averaged sum only needs to be computed over one part, either the real or imaginary part, respectively.

In case the receiver implementation demands a cyclic shift of the FFT, another cyclic shift factor dependent phase can be added or subtracted (dependent on the used variant of the invention) to make the tracking loop immune to any number of cyclic shifts applied prior to the FFT. This phase is $2\pi N s/FFTSIZE$, where s denotes the number of cyclic shifts in samples, and FFTSIZE is the FFT input and output vector size.

Yet another embodiment of this invention foresees a combination of different variants of the disclosed time error estimator to reduce the noise in the error signal. This combination consists of multiple parallel variants of the implementation shown in FIG. 6 that each individually estimate the symbol time error value ε, but e.g. use different shift factors. A combined error estimate is then obtained by adding the estimates provided by the individual symbol time error values ε of the time error estimator 14.

For closing the tracking loop, the symbol time error value ε is fed into a loop filter that performs additional averaging to reduce noise of the symbol time error value ε. The design of a tracking loop is straightforward, once a suitable time error estimator 14, e.g., as the one disclosed in this document, has been found. A suitable first order loop filter 15 can be the one depicted in FIG. 7.

Figure 7:
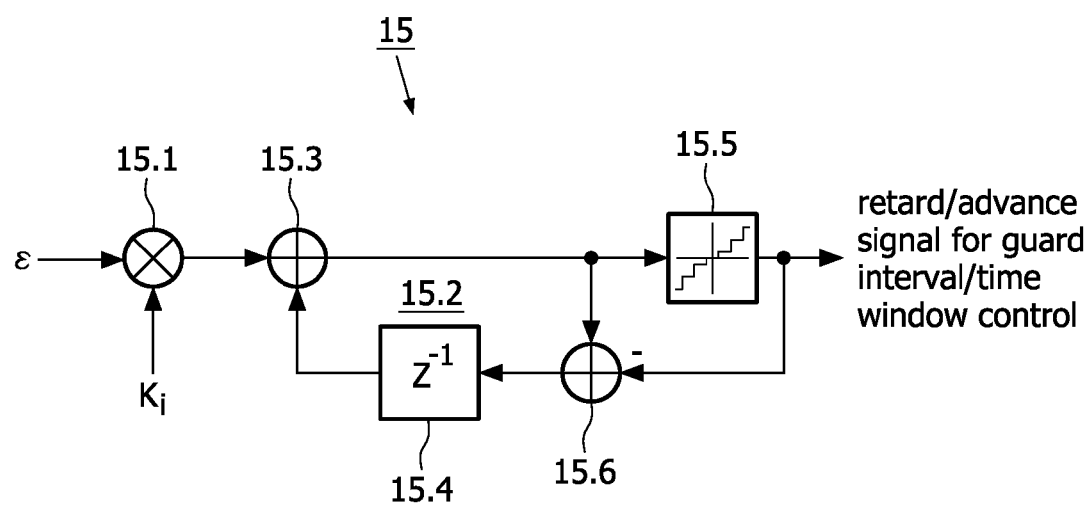
FIG. 7 shows a block diagram of a embodiment of a suitable loop filter for time tracking DLL.

In FIG. 7, the symbol time error value ε from the time error estimator 14 is first multiplied with integration constant $K_i$ in a multiplication block 15.1. This constant determines the loop filter bandwidth. The product is accumulated in the successive integration circuit 15.2 with sum blocks 15.3 and a delay block 15.4 and a quantizer 15.5 with a sum block 15.6. In Detail, i.e. the output-signal of the multiplication block 15.1 is added to the sum of all previously accumulated values enabled by the one value delay element denoted as $z^{-1}$. The accumulated value is also given to the quantizer 15.5 that contains the zero value. If the sum exceeds one or more integer numbers, the integer number is given out as a retard/advance signal to the guard interval/time window control block 4 to advance or retard by an integer number of samples on the incoming sample stream in the sample rate converter 3. At the same time, the integer value is subtracted from the accumulated value in the loop filter 15.

In a similar fashion, typically using a second or higher order loop filter, the time drift can be estimated. The time drift estimate can then be used to adjust the sample rate conversion factor at the sample rate converter 3.

In the remainder of this section, the performance of the time error estimator 14 is illustrated.

Figure 8:
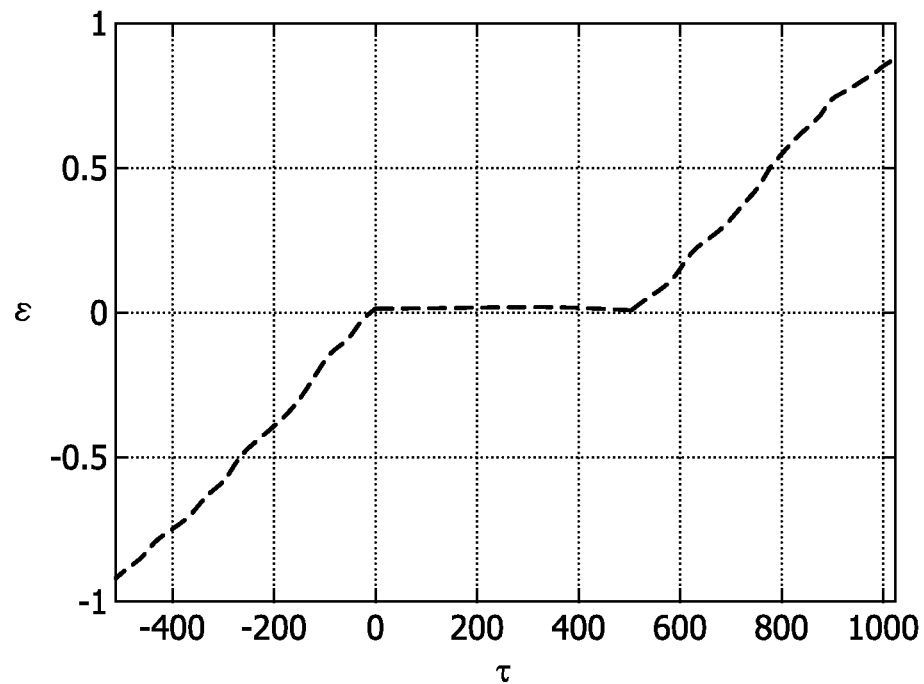
FIG. 8 shows a diagram with an example for an S-curve for single path with a guard interval 1/4, FFT size 2 k, SNR 10 dB.

FIG. 8 shows the almost perfect S-curve obtained from simulations for two consecutive OFDM symbols, where the channel is a single path channel. The FFT size is 2048 samples, and the guard interval is ¼. White Gaussian noise has been added with an SNR of 10 dB. The combined estimator is used that applies a positive and a negative shift by one FFT sample to the output of the previous symbol. The S-curve has been obtained by simulating the symbol time error value c, for time offsets, t, where $\tau$ is defined in samples, and here $\tau=0$ means the FFT is calculated on the first samples of an OFDM symbol, i.e. the cyclic prefix is fully included in the input vector to the FFT. The S-curve shows that for offsets of $\tau$ from 0 to 511, the symbol time error value $\epsilon$ is essentially zero. For the single path channel, for this ranges no intersymbol interference occurs, and therefore, for this range there is no need for adjusting the FFT window.

For $\tau$ negative, the receiver 1 experiences intersymbol interference from the previous symbol. The symbol time error value $\epsilon$ becomes negative telling the tracking circuitry to retard on the received sample stream. For $\tau$ exceeding the guard interval duration, the receiver 1 experiences intersymbol interference from the succeeding symbol. In this case, the symbol time error value $\epsilon$ becomes positive telling the tracking circuitry to advance on the received sample stream.

Figure 9:
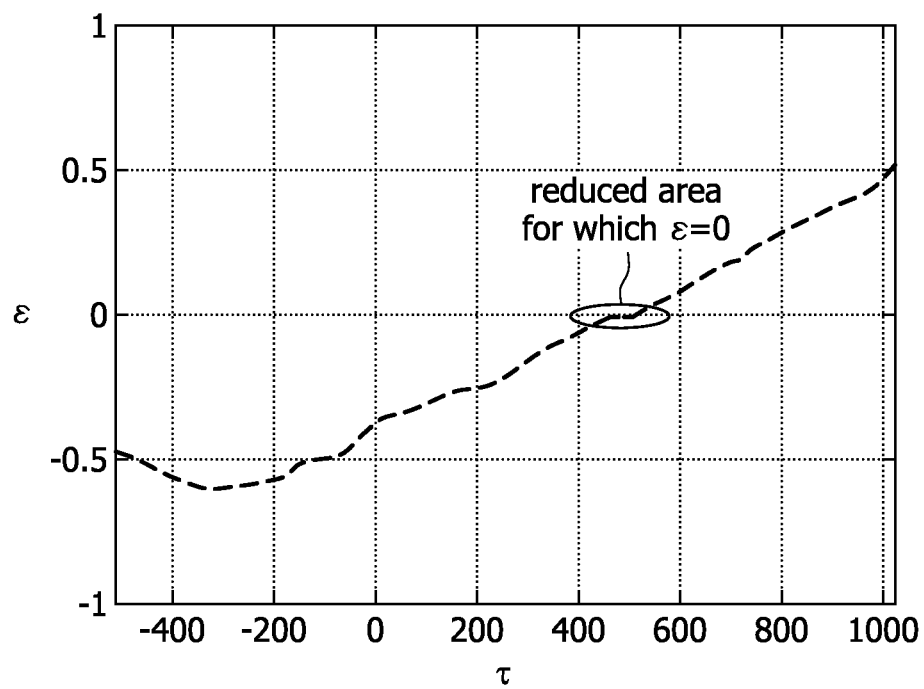
FIG. 9 shows a diagram with an example for an S-curve for two ray path with a guard interval 1/4, FFT size 2 k, SNR 10 dB, where the first path has zero delay and the second a delay of the 0.9 times of the guard interval duration.

Another example of the performance of the symbol time error estimator 14 is shown in FIG. 9. Here, a test channel with two paths of equal strength and phase with a separation of 0.9 the guard interval is used. The SNR again has been set to 10 dB. The S-curve in FIG. 9 differs from the one in FIG. 8 in that respect that the range for which symbol time error value $\epsilon$ is close to zero is substantially reduced. The channel causes OFDM symbols to overlap with the guard interval Tg of the next adjacent neighboring symbols. The range for which no intersymbol interference occurs is now limited of to the range oft greater than 460 and less or equal than 512 samples offset from the beginning of the OFDM symbol. The S-curve shown in FIG. 9 clearly shows that the time error estimator 14 is using the correct criterion. Again, for a symbol time error value $\epsilon$ being negative which happens for $\tau$ less than 460, the receiver 1 needs to retard on the received sample stream, and for $\tau$ being larger than 511, the symbol time error value $\epsilon$ becomes positive telling the receiver 1 to advance on the received sample stream.

As discussed above, albeit proposed for the context of DVB-T/H, the invention is not limited to DVB-T/H only, but applicable to a wide range of OFDM systems including DAB, ISDB-T, DMB-T, and possibly others e.g. in ADSL/VDSL or to the upcoming WiBro and WiMax standards.

LIST OF NUMERALS

1 receiver
2 frequency error correction unit
3 sample rate converter
4 window selection and guard interval removing unit
5 FFT unit
6 pilot extraction unit
7 common phase error estimator
8 common phase error correction unit
9 frequency tracking unit
10 equalizer
11 channel estimator
12 scattered pilot extraction unit
13 outer receiver
13.1 to 13.7 functional blocks of the outer receiver
14 symbol time error estimator
14.1 sample selection block
14.2 phase vector multiplication block
14.3 samples shifter block
14.4 sample symbols multiplication block
14.5 buffer unit
14.6 sum block
14.7 constant multiplication block
14.8 mapping block
15 loop filter
15.1 multiplication block
15.2 successive integration block
15.3 sum block
15.4 delay block
15.5 quantizer
15.6 sum block

The invention claimed is:

1. A method comprising:
determining a symbol time error of an output signal of a Discrete Fourier Transform (DFT) block in a data symbol stream based upon both intersymbol correlation using a predetermined period in each received symbol in the data symbol stream and a predetermined phase vector, wherein the determining step further comprises:
applying the predetermined phase vector to a symbol of interest but not to a current symbol,
selecting, as the predetermined period, a number of samples of a useful part of both the current symbol and the symbol of interest, and
determining the symbol time error based on the intersymbol correlation of the selected samples.

2. The method according to claim 1, wherein the symbol of interest is a succeeding symbol.

3. The method according to claim 1, further comprising:
copying the selected samples as a cyclic extension either preceding or succeeding an interval of the output signal for each symbol at a transmitter after an Inverse Fourier Transform (IFT) for the cyclic extension.

4. The method according to claim 1, wherein the number of the selected samples on which the DFT is performed equals a length of the DFT.

5. The method according to claim 3, further comprising:
shifting output samples of a relevant symbol by a predetermined number of N samples, wherein the relevant symbol is either the current symbol, a preceding symbol, or a succeeding symbol;
providing the predetermined phase vector to the shifted output samples of the relevant symbol to provide phase modified samples;
element-wise complex-conjugate multiplying the phase modified samples of the relevant symbol with samples of a buffered symbol;
calculating a sum-signal of the element-wise complex-conjugate multiplied samples; and
multiplying the calculated sum-signal with a phase rotating constant to map the symbol time error to either a real axis or an imaginary axis.

6. The method according to claim 5, comprising:
providing the predetermined phase vector over two branches.

7. The method according to claim 6, comprising:
shifting samples between the two branches with sample shift factors of at least −2, −1, 1, and 2.

8. The method according to claim 5, wherein the phase rotating constant depends on a predetermined period of one of the symbols, on a guard interval duration $T_g$, on a number of sample shifts, and on a phase of an integer multiple of $\pi/2$.

9. The method according to claim 8, wherein the phase of the integer multiple has an value of either $2\pi |N|T_g/Tu$ or $2\pi |N|s/FFTSize$, wherein s denotes a number of cyclic shifts in samples prior to calculating the DFT, FFTSize denotes an input and output vector size, and $T_u$ is a length of the useful part.

10. The method according to claim 1, comprising:
determining a number of individual symbol time error values by using different sample shift factors.

11. The method according to claim 10, comprising:
determining a combined symbol time error by adding the individual symbol time error values.

12. The method according to claim 1, comprising:
using the determined symbol time error to adjust timing of a broadband transmission system.

13. The method according to claim 1, comprising:
using the determined symbol time error to either advance or retard a Fast Fourier Transformation (FFT) selection window.

14. The method according to claim 1, comprising:
using the determined symbol time error to either increase or decrease a sample conversion rate in a sample rate converter.

15. The method according to claim 1, comprising:
using the determined symbol time error to either increase or decrease a sample rate in an analog to digital converter.

16. A system comprising:
a time error estimator that is configured to determine a symbol time error of an output signal of a Discrete Fourier Transform (DFT) block in the data symbol stream based upon both intersymbol correlation using a predetermined period in each received symbol and a predetermined phase vector, wherein the time error estimator is further configured to:
apply the predetermined phase vector to a symbol of interest but not to a current symbol,
select a number of samples of a useful data part of the current symbol and the symbol of interest as the predetermined period, and
determine the symbol time error based upon the intersymbol correlation of the selected samples of the current symbol and the symbol of interest; and
a loop filter configured to receive the symbol time error from the time error estimator.

17. The system according to claim 16, comprising:
a unit that selects a number of samples of the DFT block.

18. The system according to claim 17, comprising:
a buffer that stores the selected samples of one symbol.

19. The system according to claim 16, comprising:
a unit that shifts the samples of a relevant symbol by a predetermined number of N samples, wherein the relevant symbol is either the current symbol, a preceding symbol, or a succeeding symbol;
a unit that provides a predetermined phase vector to the shifted samples to provide phase modified samples;
a unit that element-wise complex-conjugate multiplies the phase modified samples of the relevant symbol with samples of a buffered symbol;
a unit that calculates a sum-signal of the element-wise complex-conjugate multiplied samples; and
a unit that multiplies the calculated sum-signal with a phase rotating constant to map the symbol time error to either a real or an imaginary axis.

20. The system according to claim 16, wherein the symbol time error of the time error estimator is used to adjust timing of a broadband transmission system.

21. The system according to claim 16, wherein the symbol time error of the time error estimator is used to either advance or retard a Fast Fourier Transformation (FFT) selection window.

22. The system according to claim 16, wherein the symbol time error of the time error estimator is used to either increase or decrease a sample conversion rate in a sample rate converter.

23. The system according to claim 16, wherein the symbol time error of the time error estimator is used to either increase or decrease a sample rate in an analog to digital converter.

24. The system according to claim 16, wherein the symbol time error is averaged by either a Finite Impulse Response (FIR) loop filter or an Infinite Impulse Response (IIR) loop filter and a output of the loop filter is used to adjust timing of a broadband transmission system.

* * * * *